US010369774B2

(12) United States Patent
Bonicatto et al.

(10) Patent No.: US 10,369,774 B2
(45) Date of Patent: Aug. 6, 2019

(54) THERMALLY CONDUCTIVE DE-BONDING AID

(71) Applicant: Microsoft Technology Licensing, LLC, Redmond, WA (US)

(72) Inventors: James Michael Bonicatto, Seattle, WA (US); Han Li, Sammamish, WA (US); David John Huston, Seattle, WA (US); James David Holbery, Bellevue, WA (US); Siyuan Ma, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/639,581

(22) Filed: Jun. 30, 2017

(65) Prior Publication Data
US 2019/0001654 A1    Jan. 3, 2019

(51) Int. Cl.
*B32B 43/00* (2006.01)
*B32B 41/00* (2006.01)
*G06F 1/16* (2006.01)
*G06F 3/041* (2006.01)
*G02F 1/1333* (2006.01)

(52) U.S. Cl.
CPC ............ *B32B 43/006* (2013.01); *B32B 41/00* (2013.01); *G06F 1/1637* (2013.01); *G06F 3/0412* (2013.01); *B32B 2315/08* (2013.01); *B32B 2457/208* (2013.01); *G02F 2001/133331* (2013.01); *G02F 2202/28* (2013.01); *Y10S 156/924* (2013.01); *Y10T 156/1158* (2015.01); *Y10T 156/1917* (2015.01)

(58) Field of Classification Search
CPC ......... Y10T 156/1158; Y10T 156/1168; Y10T 156/1917; B32B 43/006; C09J 2205/302; Y10S 156/924
See application file for complete search history.

(56) References Cited

U.S. PATENT DOCUMENTS

| | | | | |
|---|---|---|---|---|
| 4,184,000 A | * | 1/1980 | Denman | .................... C09J 7/00 156/107 |
| 4,555,607 A | * | 11/1985 | Roentgen | ................ B29C 35/12 156/273.9 |

(Continued)

FOREIGN PATENT DOCUMENTS

WO    2015152906 A1    10/2015

OTHER PUBLICATIONS

Kahn, Bruce E, "Patterning Processes for Flexible Electronics", in Proceedings of the IEEE, vol. 103, Issue 4, Apr. 2015, pp. 497-517.

*Primary Examiner* — Mark A Osele
(74) *Attorney, Agent, or Firm* — Holzer Patel Drennan

(57) ABSTRACT

Touchscreen computing devices are often assembled by applying an adhesive to an interface perimeter between a cover glass and a chassis. Occasionally, a device is de-bonded to troubleshoot errors in the functionality of the device. The adhesive is resistant to releasing the bond between the cover glass and a chassis by mechanical force and the cover glass may be damaged during disassembly. Passive and/or active de-bonding aids facilitate transfer of thermal energy to the adhesive in a manner that avoids or minimizes the transfer of thermal energy to heat-sensitive components of the device.

17 Claims, 5 Drawing Sheets

(56) References Cited

U.S. PATENT DOCUMENTS

| | | | |
|---|---|---|---|
| 5,100,494 A * | 3/1992 | Schmidt | B29C 65/342 |
| | | | 156/712 |
| 5,620,794 A * | 4/1997 | Burkart | B29C 65/76 |
| | | | 428/343 |
| 6,270,872 B1 | 8/2001 | Cline et al. | |
| 6,555,235 B1 | 4/2003 | Aufderheide et al. | |
| 6,587,097 B1 | 7/2003 | Aufderheide et al. | |
| 6,780,940 B2 * | 8/2004 | Yoshihara | C09J 5/06 |
| | | | 156/272.2 |
| 6,855,760 B1 * | 2/2005 | Kirsten | C09J 5/00 |
| | | | 252/62.51 R |
| 7,000,356 B2 * | 2/2006 | Tamai | B29C 47/026 |
| | | | 296/146.15 |
| 7,205,718 B2 | 4/2007 | Cok | |
| 7,411,639 B2 * | 8/2008 | Kim | G02F 1/133305 |
| | | | 349/187 |
| 8,829,556 B2 | 9/2014 | Aurongzeb et al. | |
| 9,618,973 B2 * | 4/2017 | Bergmann | B32B 7/12 |
| 9,682,451 B2 * | 6/2017 | Podges | B25B 11/005 |
| 2010/0021668 A1 | 1/2010 | Shimokawa et al. | |
| 2010/0175829 A1 * | 7/2010 | Masuda | C09J 5/06 |
| | | | 156/711 |
| 2012/0064338 A1 | 3/2012 | Niimi et al. | |
| 2014/0020845 A1 | 1/2014 | Scatena et al. | |
| 2014/0272332 A1 * | 9/2014 | Reineman | B32B 7/06 |
| | | | 428/201 |
| 2014/0287299 A1 * | 9/2014 | Krogdahl | H05K 1/02 |
| | | | 429/185 |
| 2016/0014912 A1 * | 1/2016 | Shih | H05K 3/30 |
| | | | 362/97.1 |
| 2016/0377894 A1 | 12/2016 | Park | |

* cited by examiner

THERMALLY CONDUCTIVE DE-BONDING AID

BACKGROUND

Touchscreen computing devices are often assembled by applying a pressure-sensitive or other adhesive to an interface perimeter between a cover glass and a chassis of a computing device. Occasionally, a touchscreen computing device is disassembled or de-bonded to troubleshoot errors in the functionality of the computing device. However, the adhesive often is resistant to releasing the bond between the cover glass and the chassis by mechanical force and the cover glass, display, or touch components may be damaged during disassembly.

In some implementations, the cover glass and/or the chassis is heated prior to applying the mechanical force to soften and release the bond between the cover glass and the chassis. However, some components of the computing device are sensitive to heat and may be damaged by such processes. Further, the applied heat may not effectively transmit through the cover glass to uniformly and sufficiently heat the adhesive, soften the bond between the cover glass and the chassis, and allow the cover glass to release from the chassis.

SUMMARY

Implementations described and claimed herein provide a computing device display comprising a chassis, a cover glass, and a thermally sensitive adhesive oriented between the cover glass and the chassis and extending about an entire perimeter of the display. The computing device display also comprises a thermally conductive de-bonding aid, which is also oriented between the cover glass and the chassis and located in one or more discrete sections of the perimeter of the display.

Implementations described and claimed herein further provide a method of disassembling a computing device display. The method comprises applying thermal energy to a thermally conductive de-bonding aid and lifting the cover glass from the chassis. The thermally conductive de-bonding aid is oriented between the cover glass and the chassis and is located in one or more discrete sections of the perimeter of the display. The thermally conductive de-bonding aid heats a thermally sensitive adhesive oriented between the cover glass and the chassis.

Implementations described and claimed herein still further provide a computing device display comprising a chassis, a cover glass, and a thermally sensitive adhesive oriented between the cover glass and the chassis and extending about an entire perimeter of the display. The computing device display also comprises a passive de-bonding aid also oriented between the cover glass and the chassis and located in one or more discrete sections of the perimeter of the display. The computing device display further comprises an active de-bonding aid also oriented between the cover glass and the chassis and located in one or more other discrete sections of the perimeter of the display.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

The presently disclosed passive and/or active de-bonding aids facilitate transfer of thermal energy to an adhesive that bonds cover glass to a chassis of a computing device. The passive and/or active de-bonding aids may further facilitate the transfer of thermal energy to the adhesive in a manner that avoids or minimizes the transfer of thermal energy to heat-sensitive components of the computing device (e.g., cameras or sensors).

Figure 1:
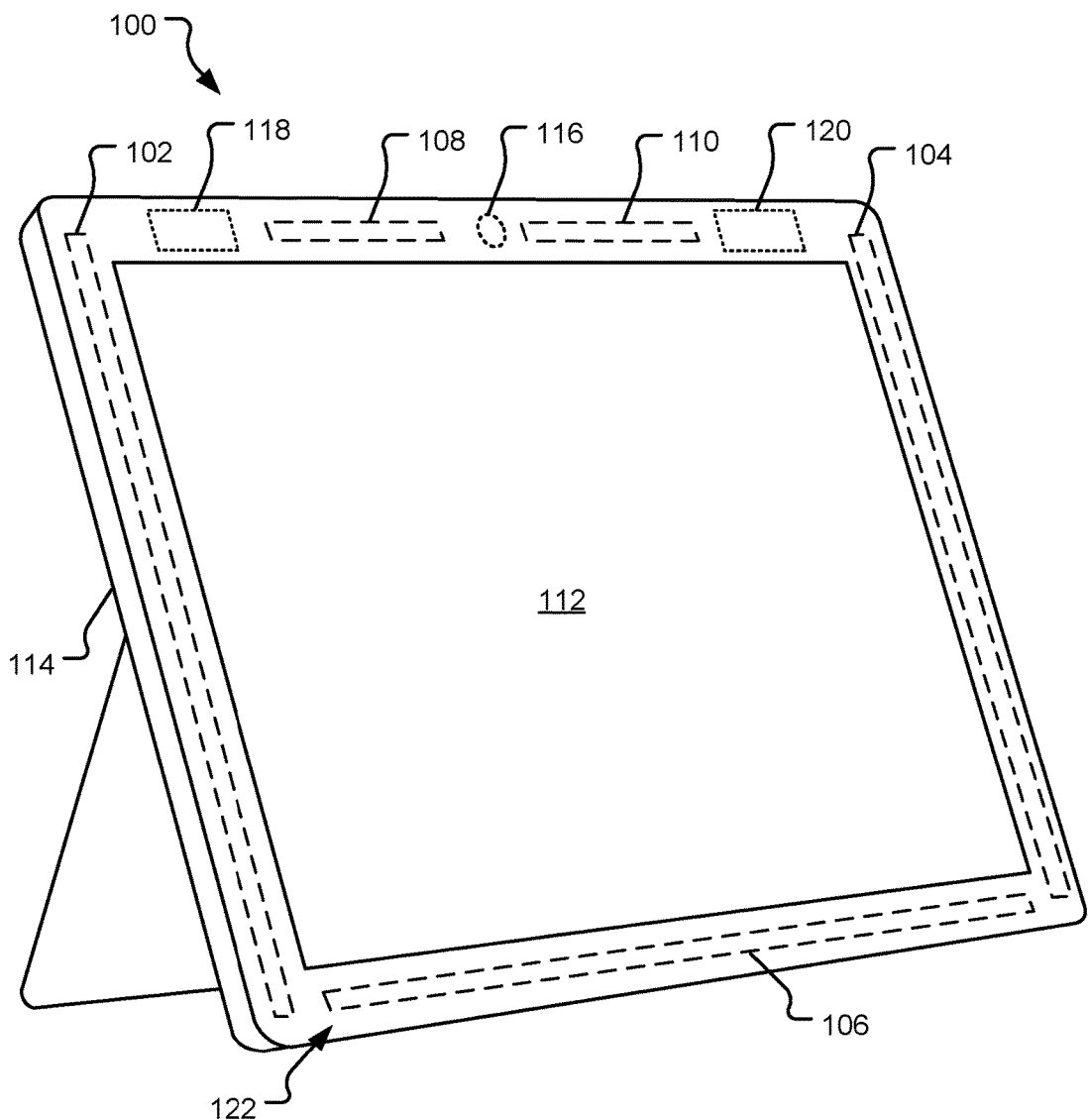
FIG. 1 illustrates a perspective view of an example tablet computer incorporating a passive thermally conductive de-bonding aid between a cover glass and a chassis of the tablet computer.

FIG. 1 illustrates a perspective view of an example tablet computer 100 incorporating a set of passive thermally conductive de-bonding aids 102, 104, 106, 108, 110 between a cover glass 112 and a chassis 114 of the tablet computer 100. The cover glass 112 (e.g., a tempered or otherwise toughened glass) spans a front-facing surface of the tablet computer 100 and serves as a transparent protective cover and mounting structure for display electronics (e.g., touch-screen, liquid crystal (LCD), light-emitting diode (LED), and organic light-emitting diode (OLED) screens) of the tablet computer 100. The chassis 114 (e.g., a metallic alloy and/or plastic frame) occupies a rear-facing surface of the tablet computer 100 and serves as a protective cover and mounting structure for additional internal components (e.g., structural framework, printed circuit boards, microprocessors, integrated circuits, electronic storage devices, cooling components, cameras, antennas, speakers, microphones, and batteries) of the tablet computer 100. One or both of the cover glass 112 and the chassis 114 may occupy side-facing surfaces of the tablet computer 100 and the cover glass 112 and the chassis 114 in combination encompass the internal components of the tablet computer 100.

Some of the internal components of the tablet computer 100 may be sensitive to heat (e.g., camera 116 and/or one or more batteries or sensors (e.g., fingerprint sensor), not shown), while other internal components of the tablet computer 100 may be subject to electromagnetic interference caused by adjacent metallic structures (e.g., antennae 118, 120). As the camera 116 and antennae 118, 120 are partially, mostly, or fully hidden internal components of the tablet computer 100, they are shown in dotted lines in FIG. 1. As a result, the passive de-bonding aids 102, 104, 106, 108, 110 are located in discrete sections of a perimeter of the tablet computer 100 in order to avoid areas of the perimeter of the tablet computer 100 occupied by the camera 116, the antennae 118, 120, or other components of the tablet computer 100 that are sensitive to heat or close proximity of metallic structures.

More specifically, the tablet computer 100 includes a mask band 122 (e.g., a black mask) that runs about the perimeter of the tablet computer 100. An adhesive (not shown) that bonds the cover glass 112 to the chassis 114 may be located adjacent the mask band 122 and the mask band 122 conceals the adhesive. The passive de-bonding aids 102, 104, 106, 108, 110 are further located adjacent the mask band 122 between the cover glass 112 and the chassis 114, are concealed by the mask band 122, and are thus shown in dashed lines in FIG. 1.

The passive de-bonding aids 102, 104, 106, 108, 110 take the form of thin strips of thermally conductive material (e.g., metal or metal alloys such as gold, silver, aluminum, and copper alloys; metal oxides such as aluminum oxide and zinc oxide; nitrides such as boron nitride; phase-change materials; or any combination thereof) between the mask band 122 and the adhesive. The passive de-bonding aids 102, 104 each span a height dimension of the tablet computer 100. The passive de-bonding aid 106 spans a width dimension of the tablet computer 100. The passive de-bonding aids 108, 110 each span specific partial width dimensions of the tablet computer 100. In sum, the passive de-bonding aids 102, 104, 106, 108, 110 are located in discrete sections of the perimeter of the tablet computer 100 to aid in releasing the adhesive bonding the cover glass 112 to the chassis 114, while avoiding sensitive perimeter areas of the tablet computer 100 occupied by the cameras (e.g., camera 116), the antennae (antennae 118, 120) or other components that are sensitive to heat or close proximity of metallic structures.

In an example implementation, the passive de-bonding aids 102, 104, 106, 108, 110 are 1 µm to 10 µm thick and 1 mm to 8 mm wide and occupy 10% to 90% of the perimeter of the tablet computer 100. Further, the passive de-bonding aids 102, 104, 106, 108, 110 are spaced apart 1 mm to 20 mm or more from the components of the tablet computer 100 that are sensitive to heat or close proximity of metallic structures.

In other implementations, passive de-bonding aids may take the form of a series of pads, foils, or wires, in a variety of sizes, shapes, and orientations. Still further, passive de-bonding aids may be physically separate structures that are bonded to the tablet computer 100 or structures screen-printed onto the tablet computer 100 during assembly. In other implementations, passive de-bonding aids are incorporated as a metallic or other thermally conductive material (e.g., nano-diamond, carbon, carbide, and nitride) in the form of particles or powder entrained into the adhesive, the mask band 122, or another polymer matrix in lieu of existing within the tablet computer 100 as separate structures.

Further still, passive de-bonding aids may be separate from one another or continuous in non-sensitive perimeter areas of the tablet computer 100. In some implementations, passive-de-bonding aids are specifically oriented around the components that are sensitive to heat or close proximity of metallic structures in an effort to conduct sufficient thermal energy to release the adhesive, while avoiding achieving a temperature of the heat-sensitive components sufficient to cause damage. Further, some areas of the chassis 114 adjacent the antennae 118, 120 may be plastic, which further inhibits thermal transfer to the adhesive. Placing passive de-bonding aids adjacent to the plastic areas of the chassis 114 may compensate for the lack of thermal conductivity of the plastic areas of the chassis 114.

In some implementations, passive de-bonding aids may be used in conjunction with one or more active de-bonding aids (see e.g., active de-bonding aid 302 of FIG. 3), each of which is located in discrete sections of the perimeter of the tablet computer 100 to aid in releasing the adhesive bonding the cover glass 112 to the chassis 114. While the tablet computer 100 is illustrated in FIG. 1 and described in detail above, the passive de-bonding aids 102, 104, 106, 108, 110, or other de-bonding aids described herein, may be incorporated into a variety of other computing devices that include a display (e.g., laptop computers, personal computers, gaming devices, smart phones, or other devices that carry out one or more specific sets of arithmetic and/or logical operations) having a variety of physical forms, including various sizes and shapes.

Figure 2:
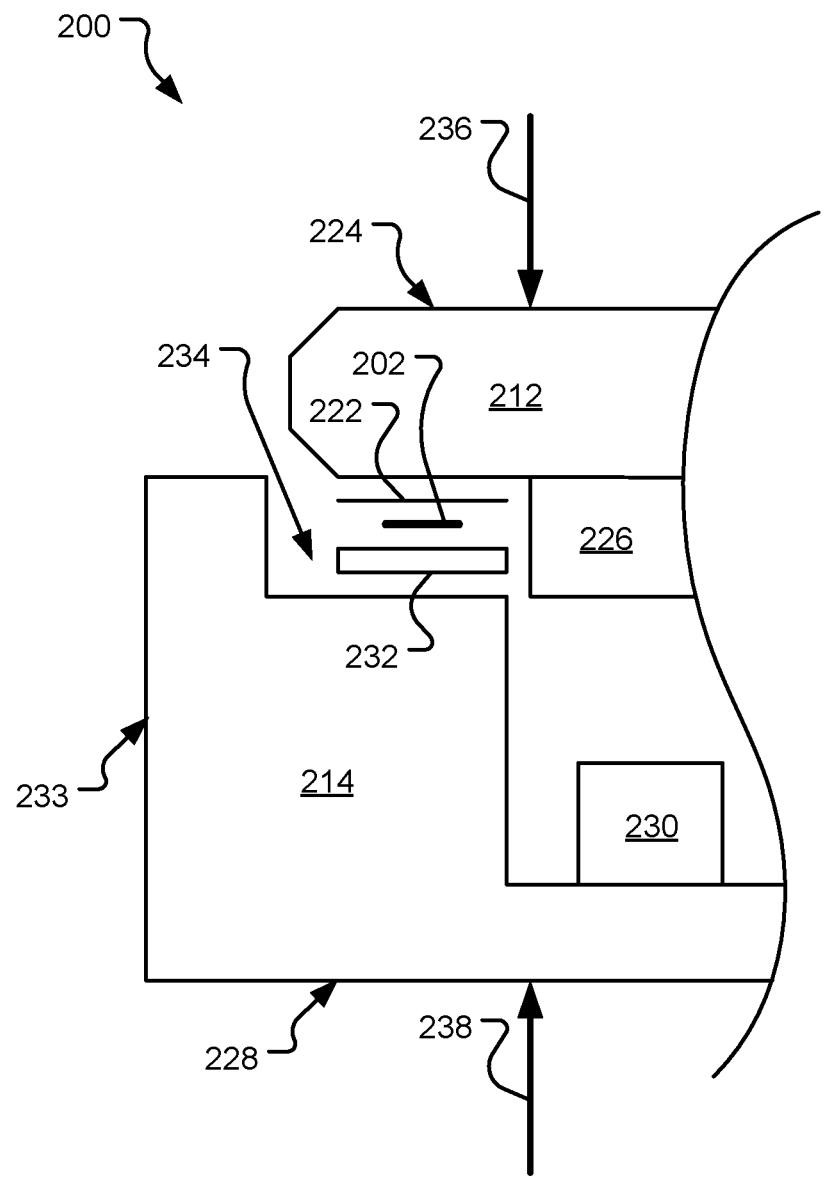
FIG. 2 illustrates a partial exploded sectional view of an example tablet computer incorporating a passive thermally conductive de-bonding aid between a cover glass and a chassis of the tablet computer.

FIG. 2 illustrates a partial exploded sectional view of an example tablet computer 200 incorporating a passive thermally conductive de-bonding aid 202 between a cover glass 212 and a chassis 214 of the tablet computer 200. The cover glass 212 spans a front-facing surface 224 of the tablet computer 200 and serves as a transparent protective cover and mounting structure for display electronics 226 of the tablet computer 200. The chassis 214 occupies a rear-facing surface 228 of the tablet computer 200 and serves as a protective cover and mounting structure for additional internal components (e.g., component 230) of the tablet computer 200. One or both of the cover glass 212 and the chassis 214 may occupy side-facing surfaces (e.g., surface 233) of the tablet computer 200. The cover glass 212 and the chassis 214 in combination encompass the internal components (e.g., the display electronics 226 and the internal component 230) of the tablet computer 200.

Some of the internal components of the tablet computer 200 may be sensitive to heat, while other internal components of the tablet computer 200 may be subject to electromagnetic interference caused by adjacent metallic structures. As a result, the passive de-bonding aid 202 is located in a discrete section of a perimeter of the tablet computer 200 in order to avoid areas of the perimeter of the tablet computer 200 occupied by the components that are sensitive to heat or close proximity of metallic structures.

More specifically, the tablet computer 200 includes a mask band 222 that runs about the perimeter of the tablet computer 200. An adhesive 232 bonds the cover glass 212 to the chassis 214 and the mask band 222 conceals the adhesive 232. As the passive de-bonding aid 202 is located between the mask band 222 and the adhesive 232, it is also concealed by the mask band 222. The passive de-bonding aid 202 may take the form of a thin strip of thermally conductive material embedded between the mask band 222 and the adhesive 232 to aid in releasing the adhesive 232 bonding the cover glass 212 to the chassis 214 of the tablet computer 200.

The tablet computer 200 may include an array of passive de-bonding aids as described with reference to passive de-bonding aid 202 that are located in one or more discrete sections of the perimeter of the tablet computer 200. The passive de-bonding aids may take the form of a series of pads, foils, or wires, in a variety of sizes, shapes, and orientations. In other implementations, the passive de-bonding aids are incorporated as a metallic or other thermally conductive material (e.g., nano-diamond, carbon, carbide, and nitride) in the form of particles or powder entrained into the adhesive 232, the mask band 222, or another polymer matrix in lieu of existing within the tablet computer 200 as a separate structure.

Still further, passive de-bonding aids may be physically separate structures that are bonded to the tablet computer 200 or structures screen-printed onto the tablet computer 200 during assembly. Further still, passive de-bonding aids may be separate from one another, or continuous in non-sensitive perimeter areas of the tablet computer 200. In some implementations, passive de-bonding aids are specifically oriented around the components that are sensitive to heat or close proximity of metallic structures in an effort to conduct sufficient thermal energy to release the adhesive, while avoiding achieving a temperature of the heat-sensitive components sufficient to cause damage. In some implementations, passive de-bonding aids may be used in conjunction with one or more active de-bonding aids (see e.g., active de-bonding aid 302 of FIG. 3), each of which is located in discrete sections of the perimeter of the tablet computer 200 to aid in releasing the adhesive bonding the cover glass 212 to the chassis 214.

The tablet computer 200 may be assembled by printing one or more layers of mask onto an inner perimeter of the cover glass 212, which in combination forms the mask band 222. Multiple layers of mask material may provide a desired thickness of the mask band 222, different types of mask material, and/or redundancy, which may conceal any defects in one of the layers of mask material. The display electronics 226 are attached to the inner surface of the cover glass 212 inside the perimeter formed by the mask band 222.

The chassis 214 is filled with internal components (e.g., component 230), some of which may be communicatively connected to the display electronics 226 (e.g., via a ribbon cable, not shown). One or more layers of the adhesive 232 may be applied to either or both of a cover glass seat 234 of the chassis 214 and the inner perimeter of the cover glass 212 underneath the mask band 222. In some implementations, a layer of foam (not shown) is oriented between two layers of adhesive 232 to aid in adhesion. Passive de-bonding aids may be oriented within or adjacent this layered structure of adhesive 232 and foam.

The tablet computer 200 is then precisely aligned and pressed together, as illustrated by arrows 236, 238. In various implementations, the adhesive 232 is pressure-sensitive and may readily adhere the cover glass 212 to the chassis 214 upon contact and application of compressive force. In some implementations, heat is applied in addition to pressure to adhere the cover glass 212 to the chassis 214 using the adhesive 232. In other implementations, the adhesive may be non-pressure sensitive (e.g., a rubber-based adhesive) that is partially melted (e.g., via a laser) to adhere the cover glass 212 to the chassis 214 after the cover glass 212 is precisely oriented on the chassis 214. The assembled tablet computer 200 may then be disassembled as described in detail with reference to FIG. 5 below.

Figure 3:
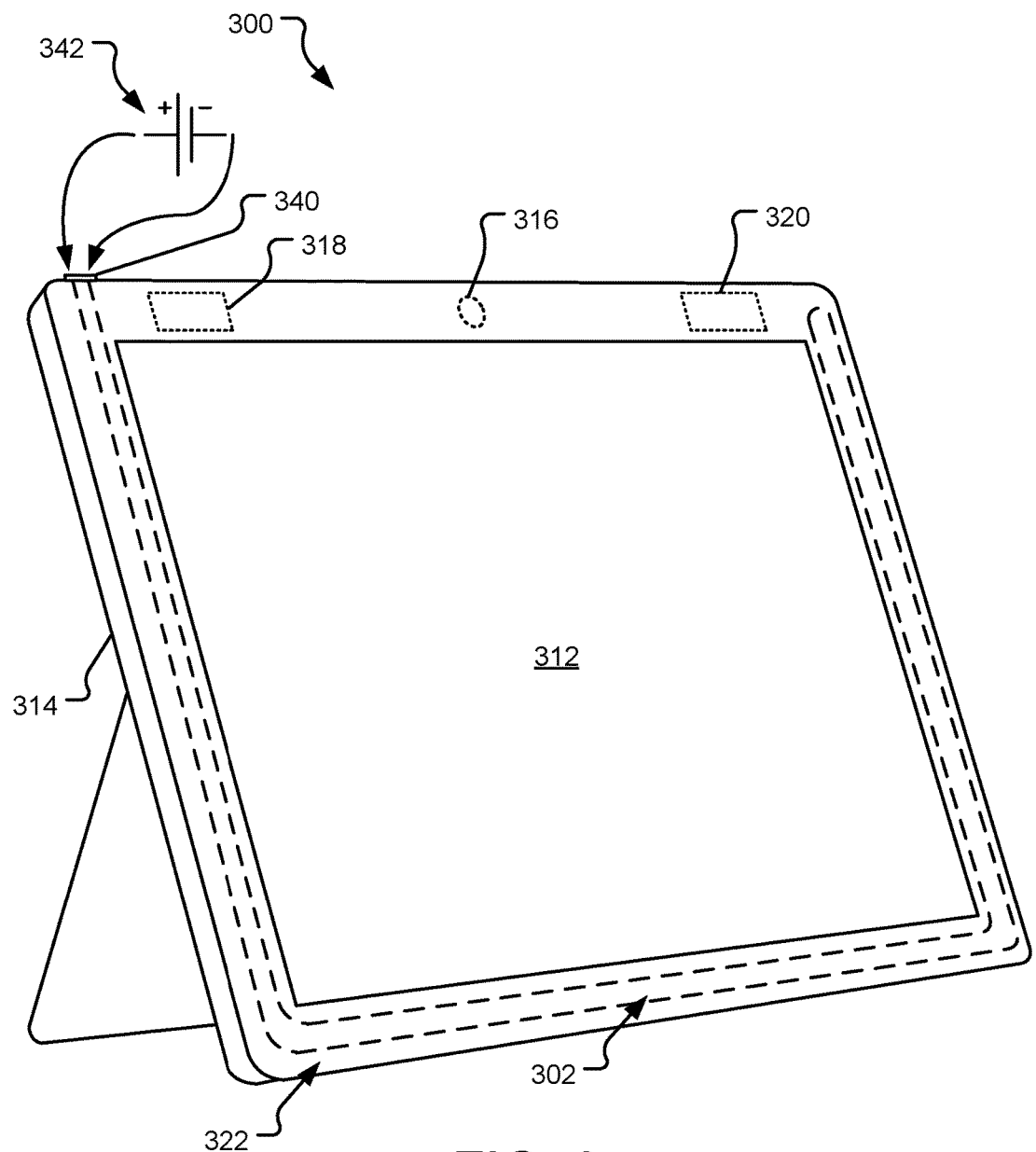
FIG. 3 illustrates a perspective view of an example tablet computer incorporating an active thermally conductive de-bonding aid between a cover glass and a chassis of the tablet computer.

FIG. 3 illustrates a perspective view of an example tablet computer 300 incorporating an active thermally conductive de-bonding aid 302 between a cover glass 312 and a chassis 314 of the tablet computer 300. The cover glass 312 spans a front-facing surface of the tablet computer 300 and serves as a transparent protective cover and mounting structure for display electronics (not shown) of the tablet computer 300. The chassis 314 occupies a rear-facing surface of the tablet computer 300 and serves as a protective cover and mounting structure for additional internal components (not shown) of the tablet computer 300. One or both of the cover glass 312 and the chassis 314 may occupy side-facing surfaces of the tablet computer 300. The cover glass 312 and the chassis 314 in combination encompass the internal components of the tablet computer 300.

Some of the internal components of the tablet computer 300 may be sensitive to heat (e.g., camera 316 or one or more batteries or sensors, not shown), while other internal components of the tablet computer 300 may be subject to electromagnetic interference caused by adjacent metallic structures (e.g., antennae 318, 320). As the camera 316 and antennae 318, 320 are partially, mostly, or fully hidden internal components of the tablet computer 300, they are shown in dotted lines in FIG. 3. As a result, the active de-bonding aid 302 is located in discrete sections of a perimeter of the tablet computer 300 in order to avoid areas of the perimeter of the tablet computer 300 occupied by the camera 316, antennae 318, 320, or other components of the tablet computer 300 that are sensitive to heat or close proximity of metallic structures.

More specifically, the tablet computer 300 includes a mask band 322 that runs about the perimeter of the tablet computer 300. An adhesive (not shown) may bond the cover glass 312 to the chassis 314 and the mask band 322 conceals the adhesive. The active de-bonding aid 302 is further located between the cover glass 312 and the chassis 314, is concealed by the mask band 322, and is thus shown in dashed lines in FIG. 3.

The active de-bonding aid 302 may take the form of a conductive wire (e.g., a metal or metal alloy, such as gold, silver, aluminum, or copper alloy wire), a structure made of a high-resistance material (e.g., carbon), or any combination thereof running between the cover glass 312 and the chassis 314, and perhaps between the mask band 322 and the adhesive of the tablet computer 300. The conductive wire traverses a path about a discrete section of the perimeter of the tablet computer 300 from port 340 and then returns to the port 340. The conductive wire may take a similar path to return to the port 340, as shown in FIG. 3, or a significantly different path back to the port 340.

In conjunction with a power supply 342 (e.g., a battery or other power source), the conductive wire forms an electrical circuit and operates as a resistance heater within the perimeter of the tablet computer 300 to aid in releasing the adhesive bonding the cover glass 312 to the chassis 314 in areas adjacent the conductive wire, while avoiding sensitive perimeter areas of the tablet computer 300 occupied by cameras (e.g., the camera 316), antennae (the antennae 318, 320) or other components that are sensitive to heat or close proximity of metallic structures.

In some implementations, the power supply 342 is external from the tablet computer 300 and is selectively connected to the port 340 to create the electrical circuit. When not in use, the port 340 may be covered (e.g., with a friction-fit plug, not shown) to prevent contaminates from disrupting the port 340 and provide an improved visual or tactile experience for an end user by hiding the port 340 from the end user. In other implementations, the port 340 is omitted and the power supply 342 is internal to the tablet computer 300 and switched such that it only selectively operates when disassembling the tablet computer 300.

In an example implementation, the active de-bonding aid 302 includes 0.5 mm to 1.0 mm diameter wire and occupies 10% to 90% of the perimeter of the tablet computer 300. Further, the active de-bonding aid 302 is spaced apart 1 mm to 20 mm or more from the components of the tablet computer 300 that are sensitive to heat or close proximity of metallic structures.

The tablet computer 300 may include an array of active de-bonding aids as described with reference to active de-bonding aid 302 that are located in one or more discrete sections of the perimeter of the tablet computer 300. The active de-bonding aids may take the form of a series of pads, foils, or wires, in a variety of sizes, shapes, and orientations. Still further, the active de-bonding aids may be physically separate structures that are bonded to the tablet computer 300 or structures screen-printed onto the tablet computer 300 during assembly. In other implementations, the active de-bonding aids are incorporated as a metallic or other thermally conductive material (e.g., nano-diamond, carbon, carbide, and nitride) in the form of particles or powder entrained into the adhesive, the mask band 322, or another polymer matrix in lieu of existing within the tablet computer 300 as a separate structure.

Further still, the active de-bonding aids may be separate from one another or continuous in non-sensitive perimeter areas of the tablet computer 300. In some implementations, active de-bonding aids are specifically oriented around the components that are sensitive to heat or close proximity of metallic structures in an effort to conduct sufficient thermal energy to release the adhesive, while avoiding achieving a temperature of the heat-sensitive components sufficient to cause damage. In some implementations, the active de-bonding aids may be used in conjunction with one or more passive de-bonding aids (see e.g., passive de-bonding aids 102, 104, 106, 108, 110 of FIG. 1), each of which is located in discrete sections of the perimeter of the tablet computer 300 to aid in releasing the adhesive bonding the cover glass 312 to the chassis 314.

While the tablet computer 300 is illustrated in FIG. 3 and described in detail above, the active de-bonding aid 302, or other de-bonding aids described herein, may be incorporated into a variety of other computing devices that include a display (e.g., laptop computers, personal computers, gaming devices, smart phones, or other devices that carry out one or more specific sets of arithmetic and/or logical operations) having a variety of physical forms, including various sizes and shapes.

Figure 4:
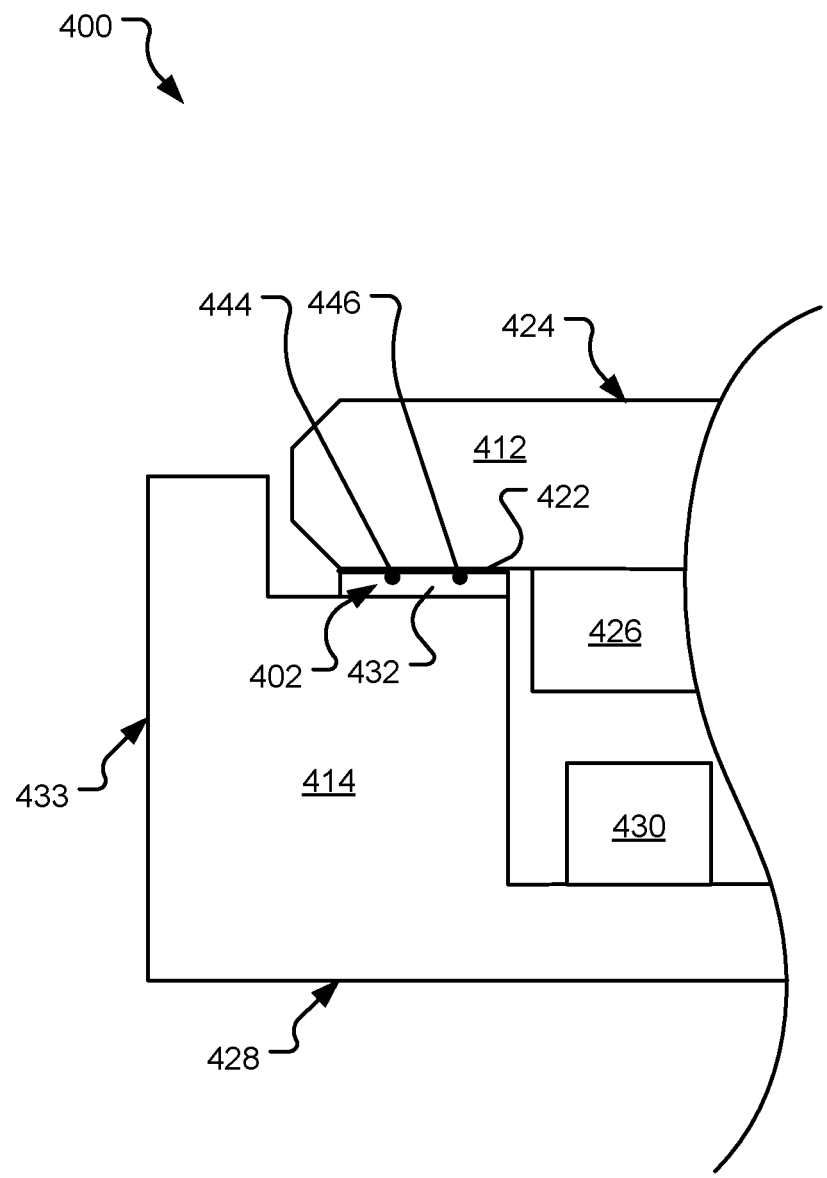
FIG. 4 illustrates a partial assembled sectional view of an example tablet computer incorporating an active thermally conductive de-bonding aid between a cover glass and a chassis of the tablet computer.

FIG. 4 illustrates a partial assembled sectional view of an example tablet computer 400 incorporating an active thermally conductive de-bonding aid 402 between a cover glass 412 and a chassis 414 of the tablet computer 400. The cover glass 412 spans a front-facing surface 424 of the tablet computer 400 and serves as a transparent protective cover and mounting structure for display electronics 426 of the tablet computer 400. The chassis 414 occupies a rear-facing surface 428 of the tablet computer 400 and serves as a protective cover and mounting structure for additional internal components (e.g., component 430) of the tablet computer 400. One or both of the cover glass 412 and the chassis 414 may occupy side-facing surfaces (e.g., surface 433) of the tablet computer 400. The cover glass 412 and the chassis 414 in combination encompass the internal components (e.g., the display electronics 426 and the internal component 430) of the tablet computer 400.

Some of the internal components of the tablet computer 400 may be sensitive to heat, while other internal components of the tablet computer 400 may be subject to electromagnetic interference caused by adjacent metallic structures. As a result, the active de-bonding aid 402 is located in a discrete section of a perimeter of the tablet computer 400 in order to avoid areas of the perimeter of the tablet computer 400 occupied by the components that are sensitive to heat or close proximity of metallic structures.

More specifically, the tablet computer 400 includes a mask band 422 that runs about the perimeter of the tablet computer 400. An adhesive 432 bonds the cover glass 412 to the chassis 414 and the mask band 422 conceals the adhesive 432. As the active de-bonding aid 402 is located between the mask band 422 and the adhesive 432, it is also concealed by the mask band 422. The active de-bonding aid 402 may take the form of an electrically-conductive wire, including both a first wire portion 444 outgoing from a power source (not shown) and a second wire portion 446 returning to the power source. In various implementations, the wire portions 444, 446 form a continuous electrical circuit in combination with the power source. The wire portions 444, 446 may run within or adjacent the mask band 422 and/or the adhesive 432. Upon application of electricity from the power source, the wire portions 444, 446 heat due to resistive heating, which aids in releasing the adhesive 432 bonding the cover glass 412 to the chassis 414 of the tablet computer 400.

The tablet computer 400 may include an array of active de-bonding aids as described with reference to active de-bonding aid 402 that are located in one or more discrete sections of the perimeter of the tablet computer 400. The active de-bonding aids may take the form of a series of pads, foils, or wires, in a variety of sizes, shapes, and orientations. In other implementations, the active de-bonding aid 402 is incorporated as a metallic or other thermally conductive material (e.g., nano-diamond, carbon, carbide, and nitride) in the form of particles or powder entrained into the adhesive 432, the mask band 422, or another polymer matrix in lieu of existing within the tablet computer 400 as a separate structure.

Still further, the active de-bonding aids may be physically separate structures that are bonded to the tablet computer 400 or structures screen-printed onto the tablet computer 400 during assembly. Further still, the active de-bonding aids may be separate from one another, or continuous in non-sensitive perimeter areas of the tablet computer 400. In some implementations, active de-bonding aids are specifically oriented around the components that are sensitive to heat or close proximity of metallic structures in an effort to conduct sufficient thermal energy to release the adhesive, while avoiding achieving a temperature of the heat-sensitive components sufficient to cause damage. In some implementations, the active de-bonding aids may be used in conjunction with one or more passive de-bonding aids (see e.g., passive de-bonding aid 202 of FIG. 2), each of which is located in discrete sections of the perimeter of the tablet computer 400 to aid in releasing the adhesive bonding the cover glass 412 to the chassis 414.

The tablet computer 400 may be assembled as described in detail above with reference to FIG. 2 and disassembled as described in detail below with reference to FIG. 5.

Figure 5:
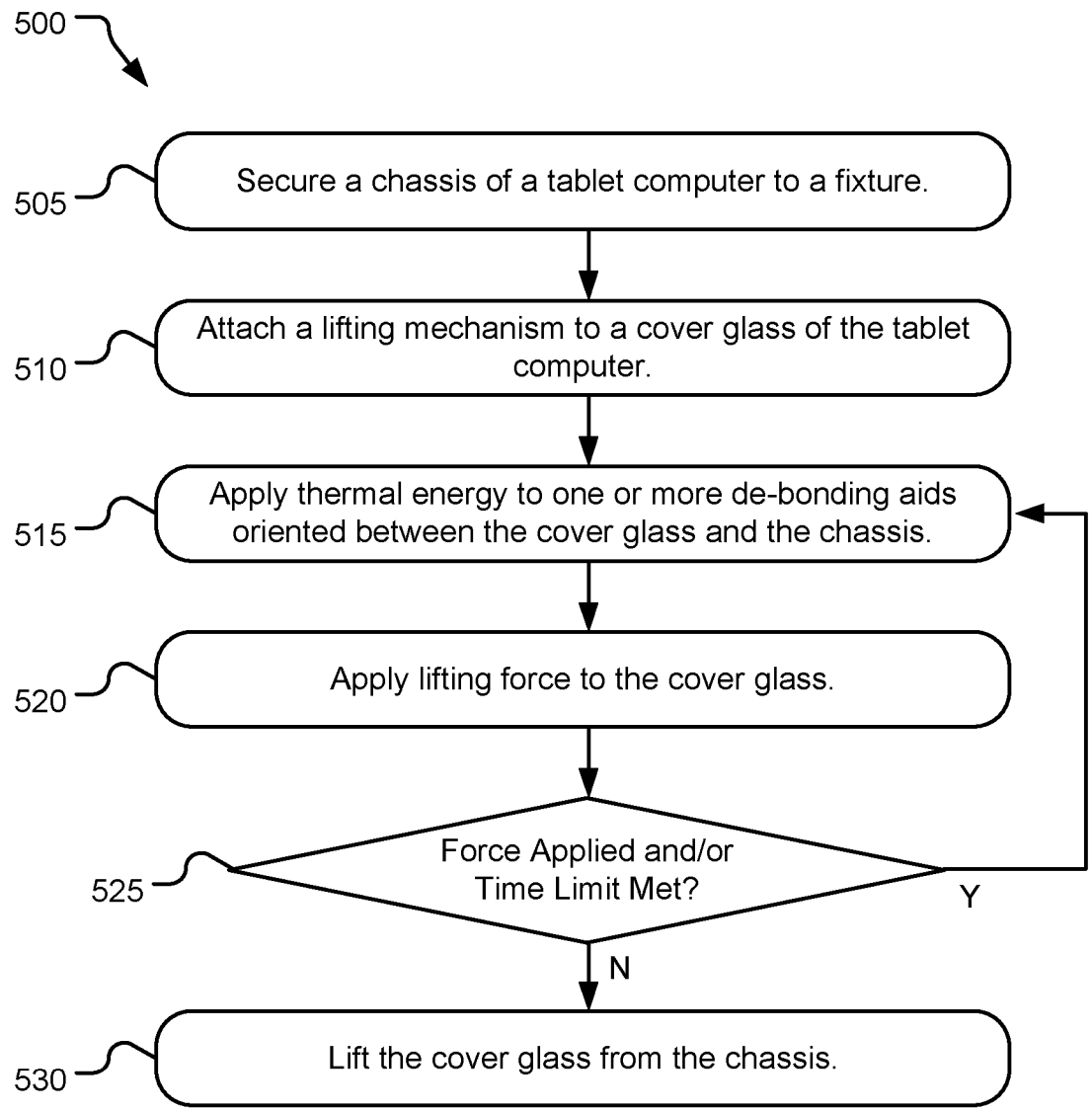
FIG. 5 illustrates example operations for de-bonding a cover glass from a chassis of a tablet computer using one or more thermally conductive de-bonding aids.

FIG. 5 illustrates example operations 500 for de-bonding a cover glass from a chassis of a tablet computer using one or more thermally conductive de-bonding aids. A securing operation 505 secures the chassis of the tablet computer to a fixture. The fixture may be a component of a specific machine adapted to disassemble tablet computers or the fixture may be any stable structure that secures the tablet computer in a fixed location. The fixture may utilize one or more of suction pressure, clamps, mechanical fasteners, and adhesives to secure the chassis to the fixture.

An attaching operation 510 attaches a lifting mechanism to the cover glass of the tablet computer. The lifting mechanism may also be a component of the machine adapted to disassemble tablet computers, or the lifting mechanism may be any structure that securely and uniformly attaches to the cover glass without damaging the cover glass. The lifting mechanism may also utilize one or more of suction pressure, clamps, mechanical fasteners, and adhesives to secure the cover glass to the lifting mechanism.

A heat applying operation 515 applies thermal energy to one or more de-bonding aids oriented between the cover glass and the chassis and located in one or more discrete sections of a perimeter of the tablet computer. In some implementations, the de-bonding aids are a passive array of thermally conductive pads, foils, or wires that are adjacent to or embedded within an adhesive that secures the cover glass to the chassis of the tablet computer. External radiant, convective, and/or conductive heat is applied to the cover glass and the passive de-bonding aids facilitate the transfer of thermal energy to the adhesive, and in some implementations, away from other temperature-sensitive components of the tablet computer. In various implementations, the external radiant and/or conductive heat is applied using an infrared heater or a hot air gun directed at the cover glass, or a conductive plate placed adjacent the cover glass.

In other implementations, the de-bonding aids are active resistive electrical circuits that are also adjacent to or embedded within the adhesive that secures the cover glass to the chassis of the tablet computer. Electrical current is applied to the active de-bonding aids and the active de-bonding aids generate resistive thermal energy that is conducted to the adhesive, and in some implementations, away from other temperature-sensitive components of the tablet computer. In other implementations, the de-bonding aids are thermoelectric devices (utilizing the Peltier effect) to create a heat flux from the de-bonding aids to the adhesive that secures the cover glass to the chassis of the tablet computer. In still further implementations, the de-bonding aids are inductive elements that are heated when inductively coupled with an external or internal electromagnet and oscillator.

In still further implementations, the de-bonding aids are a combination of passive and active de-bonding aids. All the de-bonding aids facilitate the transfer of thermal energy to the adhesive, and in some implementations, away from other temperature-sensitive components of the tablet computer. As the adhesive is heated, it's ability to secure the cover glass to the chassis of the tablet computer is weakened.

A force applying operation 520 applies lifting force to the cover glass. The lifting force is applied via the lifting mechanism, while the fixture prevents the chassis from moving. Decision operation 525 monitors the magnitude of force applied over time to the cover glass. Based on statistical data, the cover glass is only expected to withstand a certain magnitude of force over a certain period of time without causing damage. In some implementations, the force applying operation 520 applies less than 10 kgf to the cover glass.

If the force applying operation 520 is unsuccessful in lifting the cover glass from the chassis within predetermined limits of magnitude of force applied and/or time elapsed, the decision operation 525 repeats the heat applying operation 515 to further soften the adhesive and weaken its ability to secure the cover glass to the chassis of the tablet computer. The force applying operation 520 also repeats in turn. In various implementations, the heat applying operation 515 and the force applying operation 520 may be performed in sequence, iteratively, or simultaneously. If the predetermined limits of magnitude of force applied and/or time elapsed are not exceeded by the force applying operation 520, lifting operation 530 lifts the cover glass from the chassis and separates them for repair or replacement of various components of the tablet computer.

The logical operations described herein may be performed in any order, adding or omitting operations as desired, unless explicitly claimed otherwise or a specific order is inherently necessitated by the claim language.

An example computing device display according to the presently disclosed technology comprises a chassis, a cover glass, a thermally sensitive adhesive oriented between the cover glass and the chassis and extending about an entire perimeter of the display, and a thermally conductive de-bonding aid also oriented between the cover glass and the chassis and located in one or more discrete sections of the perimeter of the display.

In another example computing device display according to the presently disclosed technology, the thermally conductive de-bonding aid is heat-generating.

In another example computing device display according to the presently disclosed technology, the discrete sections of the perimeter of the display where the thermally conductive de-bonding aid is oriented are spaced apart from one or both of a camera and an antenna mounted within the computing device display.

Another example computing device display according to the presently disclosed technology further comprises a mask also oriented between the cover glass and the chassis and extending about the entire perimeter of the display. The thermally conductive de-bonding aid is oriented between the mask and the chassis.

In another example computing device display according to the presently disclosed technology, the thermally conductive de-bonding aid is screen-printed onto the cover glass.

In another example computing device display according to the presently disclosed technology, the thermally conductive de-bonding aid includes a passive array of thermally conductive pads.

In another example computing device display according to the presently disclosed technology, the thermally conductive de-bonding aid includes a thermally conductive powder entrained adhesive.

In another example computing device display according to the presently disclosed technology, the thermally conductive de-bonding aid includes an active resistive electrical circuit.

An example method of disassembling a computing device display according to the presently disclosed technology comprises applying thermal energy to a thermally conductive de-bonding aid oriented between a cover glass and a chassis and located in one or more discrete sections of a perimeter of the display, and lifting the cover glass from the chassis. The thermally conductive de-bonding aid heats a thermally sensitive adhesive oriented between the cover glass and the chassis.

Another example method of disassembling a computing device display according to the presently disclosed technology further comprises securing the chassis to a fixture prior to applying the thermal energy to the thermally conductive de-bonding aid and attaching the cover glass to a lifting mechanism prior to applying the thermal energy to the thermally conductive de-bonding aid.

In another example method of disassembling a computing device display according to the presently disclosed technology, the thermal energy is applied via the lifting mechanism.

Another example method of disassembling a computing device display according to the presently disclosed technology further comprises applying a lifting force to the cover glass and monitoring one or both of a magnitude of the lifting force applied to the cover glass and a time elapsed that the lifting force is applied to the cover glass.

Another example method of disassembling a computing device display according to the presently disclosed technology further comprises iteratively repeating the applying thermal energy operation and the lifting the cover glass operation prior to lifting the cover glass from the chassis.

Another example method of disassembling a computing device display according to the presently disclosed technology further comprises simultaneously performing the applying thermal energy operation and the lifting the cover glass operation prior to lifting the cover glass from the chassis.

In another example method of disassembling a computing device display according to the presently disclosed technology, the discrete sections of the perimeter of the display where the thermally conductive de-bonding aid is oriented are spaced apart from one or both of a camera and an antenna mounted within the computing device display.

In another example method of disassembling a computing device display according to the presently disclosed technology, the thermally conductive de-bonding aid includes a passive array of thermally conductive pads.

In another example method of disassembling a computing device display according to the presently disclosed technology, the thermally conductive de-bonding aid includes a thermally conductive powder entrained adhesive.

In another example method of disassembling a computing device display according to the presently disclosed technology, the thermally conductive de-bonding aid includes an active resistive electrical circuit.

An example computing device display according to the presently disclosed technology comprises a chassis, a cover glass, a thermally sensitive adhesive oriented between the cover glass and the chassis and extending about an entire perimeter of the display, a passive de-bonding aid also oriented between the cover glass and the chassis and located in one or more discrete sections of the perimeter of the display, and an active de-bonding aid also oriented between the cover glass and the chassis and located in one or more other discrete sections of the perimeter of the display.

In another example computing device display according to the presently disclosed technology, the discrete sections of the perimeter of the display where the de-bonding aids are oriented are spaced apart from one or both of a camera and an antenna mounted within the computing device display.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing device display comprising:
    a chassis;
    a cover glass;
    a thermally sensitive adhesive oriented between the cover glass and the chassis and extending about an entire perimeter of the display;
    a mask also oriented between the cover glass and the chassis and extending about the entire perimeter of the display; and
    a thermally conductive de-bonding aid including passive thermally conductive portions of the mask located in multiple discrete sections of the perimeter of the display spaced apart from a sensitive component mounted within the display.

2. The computing device display of claim 1, wherein the thermally conductive de-bonding aid further includes an active de-bonding aid.

3. The computing device display of claim 2, wherein the active de-bonding aid includes a resistive electrical circuit.

4. The computing device display of claim 1, wherein the sensitive component is one of a camera and an antenna.

5. The computing device display of claim 1, wherein the thermally conductive de-bonding aid is screen-printed onto the cover glass.

6. The computing device display of claim 1, wherein the thermally sensitive adhesive includes a thermally conductive powder entrained therein.

7. A method of disassembling a computing device display comprising:
    providing a mask oriented between a cover glass and a chassis and extending about an entire perimeter of the display;
    conducting thermal energy through the cover glass to a thermally conductive de-bonding aid including passive thermally conductive portions of the mask located in multiple discrete sections of the perimeter of the display spaced apart from a sensitive component mounted within the display, wherein the thermally conductive de-bonding aid heats a thermally sensitive adhesive also oriented between the cover glass and the chassis and extending about the entire perimeter of the display; and
    lifting the cover glass from the chassis.

8. The method of claim 7, further comprising:
    securing the chassis to a fixture prior to conducting the thermal energy to the thermally conductive de-bonding aid; and
    attaching the cover glass to a lifting mechanism prior to conducting the thermal energy to the thermally conductive de-bonding aid.

9. The method of claim 8, wherein the thermal energy is applied via the lifting mechanism.

10. The method of claim 7, further comprising:
    applying a lifting force to the cover glass; and
    monitoring one or both of a magnitude of the lifting force applied to the cover glass and a time elapsed that the lifting force is applied to the cover glass.

11. The method of claim 7, further comprising:
    iteratively repeating the conducting thermal energy operation and the lifting the cover glass operation.

12. The method of claim 7, further comprising:
    simultaneously performing the conducting thermal energy operation and the lifting the cover glass operation.

13. The method of claim 7, wherein the sensitive component is one of a camera and an antenna.

14. The method of claim 7, wherein the thermally sensitive adhesive includes a thermally conductive powder entrained therein.

15. The method of claim 7, further comprising:
    applying electrical energy to the thermally conductive de-bonding aid further including a resistive electrical circuit.

16. A computing device display comprising:
    a chassis;
    a cover glass;
    a thermally sensitive adhesive oriented between the cover glass and the chassis and extending about an entire perimeter of the display;

a passive array of thermally conductive de-bonding pads also oriented between the cover glass and the chassis and located in multiple discrete sections of the perimeter of the display spaced apart from a sensitive component mounted within the display; and an active de-bonding aid also oriented between the cover glass and the chassis and located in one or more other discrete sections of the perimeter of the display also spaced apart from the sensitive component mounted within the display, the active de-bonding aid to apply thermal energy to the computing device display and the passive array to direct thermal energy away from the sensitive component and toward the thermally sensitive adhesive.

17. The computing device display of claim 16, wherein the sensitive component is one of a camera and an antenna.

* * * * *